(12) United States Patent
Hong et al.

(10) Patent No.: US 11,754,350 B2
(45) Date of Patent: Sep. 12, 2023

(54) HEAT EXCHANGER MODULE, ASSEMBLY-TYPE HEAT EXCHANGER INCLUDING HEAT EXCHANGER MODULE, AND HEAT EXCHANGER ASSEMBLY SYSTEM

(71) Applicant: SAMSUNG ELECTRONICS CO., LTD., Suwon-si (KR)

(72) Inventors: Wooram Hong, Yongin-si (KR); Jeonghun Kim, Suwon-si (KR); Hyundo Choi, Yongin-si (KR); Hyukju Kwon, Anyang-si (KR); Youngjin Park, Seoul (KR); Aram Jeon, Seoul (KR); Yongsik Jung, Seoul (KR); Wonje Choi, Suwon-si (KR); Taesin Ha, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 194 days.

(21) Appl. No.: 16/942,303

(22) Filed: Jul. 29, 2020

(65) Prior Publication Data

US 2021/0180884 A1    Jun. 17, 2021

(30) Foreign Application Priority Data

Dec. 16, 2019 (KR) .................. 10-2019-0168144

(51) Int. Cl.
*F28F 9/26* (2006.01)
*F28F 7/02* (2006.01)
(Continued)

(52) U.S. Cl.
CPC ............... *F28F 9/26* (2013.01); *B25J 9/1687* (2013.01); *F28F 7/02* (2013.01); *B25J 15/00* (2013.01); *F28F 2275/14* (2013.01)

(58) Field of Classification Search
CPC ...... F28F 9/26; F28F 2280/02; F28F 2275/14; F24D 3/127
See application file for complete search history.

(56) References Cited

U.S. PATENT DOCUMENTS

| 2,538,957 A | 1/1951 | Askevold et al. |
| 3,415,316 A | 12/1968 | Burne et al. |
| (Continued) | | |

FOREIGN PATENT DOCUMENTS

| CN | 103378027 B | 11/2018 |
| DE | 102006037065 A1 | 2/2008 |
| (Continued) | | |

OTHER PUBLICATIONS

Translation of KR970001734Y1 entitled TRANSLATION-KR970001734Y1 (Year: 1997).*

(Continued)

*Primary Examiner* — Paul Alvare
(74) *Attorney, Agent, or Firm* — Sughrue Mion, PLLC

(57) ABSTRACT

A heat exchanger module includes a first heat exchanging body including at least one first through hole and a second heat exchanging body including at least one second through hole. The second heat exchanging body is configured to be coupled to the first heat exchanging body, and an accommodation hole is provided between the first heat exchanging body and the second heat exchanging body by the first heat exchanging body and the second heat exchanging body being coupled together.

12 Claims, 15 Drawing Sheets

(51) Int. Cl.
*B25J 9/16* (2006.01)
*B25J 15/00* (2006.01)

(56) References Cited

U.S. PATENT DOCUMENTS

| | | |
|---|---|---|
| 3,513,907 A | 5/1970 | Hughes |
| 3,791,326 A | 2/1974 | Schwarz |
| 3,907,683 A | 9/1975 | Gilmont |
| 6,306,658 B1 | 10/2001 | Turner et al. |
| 7,556,966 B2 | 7/2009 | Van Erden et al. |
| 8,495,890 B2 | 7/2013 | Jadric et al. |
| 9,165,858 B2 | 10/2015 | Steger et al. |
| 9,980,415 B2 | 5/2018 | Zhou et al. |
| 2005/0082158 A1 | 4/2005 | Wenger |
| 2005/0128705 A1 | 6/2005 | Chu et al. |
| 2010/0071873 A1* | 3/2010 | Campagna .............. F24D 3/127 165/56 |
| 2013/0216445 A1 | 8/2013 | Hartvigsen et al. |
| 2017/0181322 A1 | 6/2017 | Shelnutt et al. |

FOREIGN PATENT DOCUMENTS

| | | | |
|---|---|---|---|
| DE | 102012220435 A1 | 5/2014 | |
| DE | 102017128571 A1 | 6/2019 | |
| EP | 1352686 A1 * | 10/2003 | ........ B01F 15/00935 |
| FR | 2604246 A1 | 3/1988 | |
| GB | 2442978 A * | 4/2008 | ............ F16L 21/035 |
| GB | 2501413 A | 10/2013 | |
| KR | 970001734 Y1 * | 3/1997 | |
| KR | 10-1460487 B1 | 11/2014 | |
| KR | 10-1921566 B1 | 12/2018 | |
| WO | 2008052168 A2 | 5/2008 | |
| WO | 2009005417 A1 | 1/2009 | |
| WO | 2009058417 A1 | 5/2009 | |
| WO | 2019137954 A1 | 7/2019 | |

OTHER PUBLICATIONS

Translation of Patent Document EP1352686A1 entitled TRANSLATION-EP1352686A1 (Year: 2003).*
Communication dated May 19, 2021 issued by the European Patent Office in application No. 20212414.5.

* cited by examiner

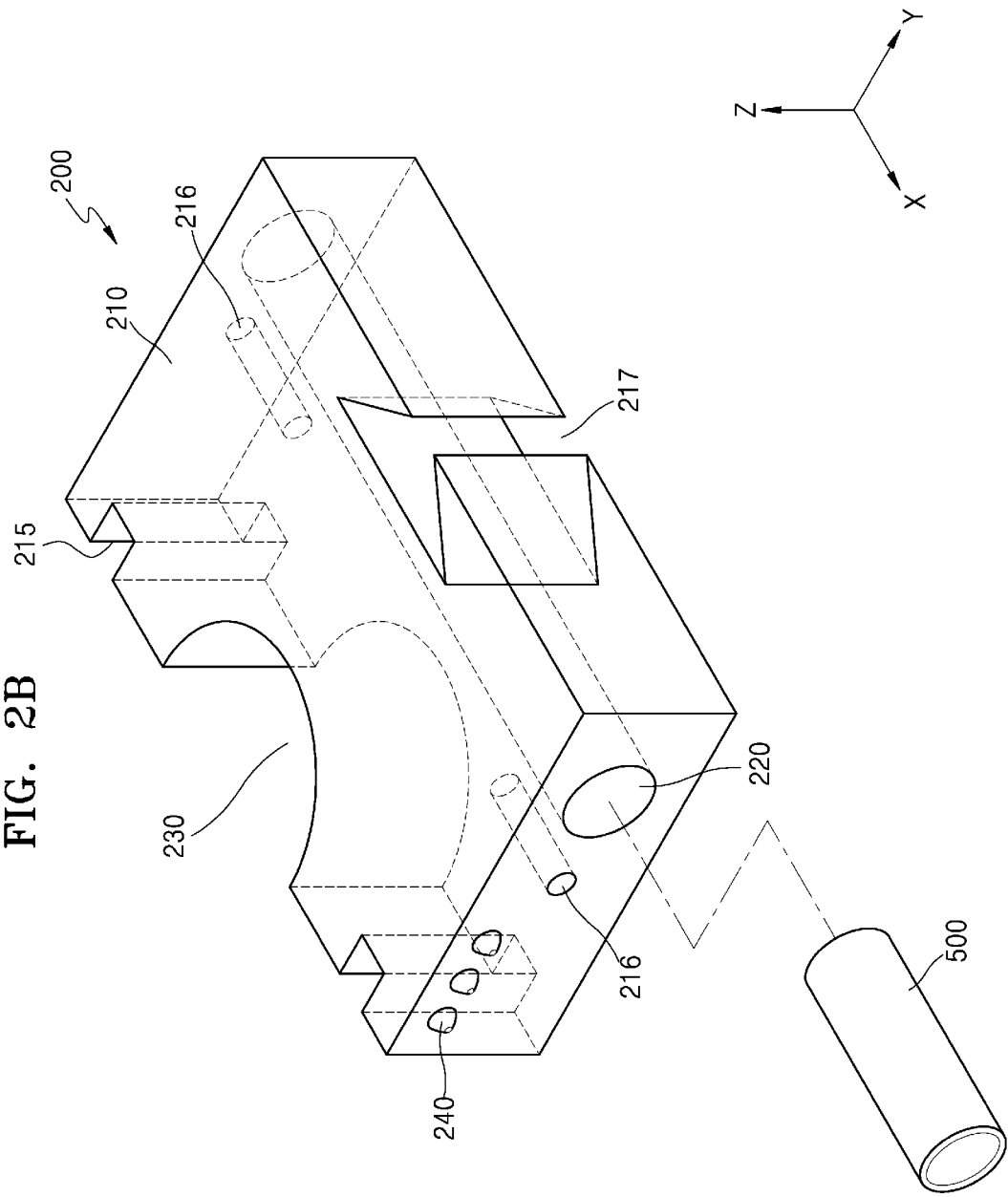

US 11,754,350 B2

HEAT EXCHANGER MODULE, ASSEMBLY-TYPE HEAT EXCHANGER INCLUDING HEAT EXCHANGER MODULE, AND HEAT EXCHANGER ASSEMBLY SYSTEM

CROSS-REFERENCE TO THE RELATED APPLICATION

This application is based on and claims priority under 35 U.S.C. § 119 to Korean Patent Application No. 10-2019-0168144, filed on Dec. 16, 2019, in the Korean Intellectual Property Office, the disclosure of which is incorporated by reference herein in its entirety.

BACKGROUND

1. Field

Embodiments of the present disclosure relate to a heat exchange module, an assembly-type heat exchanger including the heat exchange module, and a heat exchanger assembly system.

2. Description of Related Art

Recently, there has been an increasing need for a heat exchanging device for cooling or heating a processed article to be used in a medical or biological application in a low-temperature operating device and research, etc. A heat exchanging medium material for cooling or heating a target may be used. For heat exchange between a heat exchanging medium material and a processed article, a position between a path through which a heat exchanging material flows and the processed article needs to be maintained constant.

As described above, there is an increasing demand for a heat exchanging device for use in various fields, and accordingly, the shape and state of the processed article are also diversified. When a different heat exchanging device is used depending on a different shape and state of a processed article, a large space may be occupied and cost and processing yield may increase. Moreover, in response to demands for automation systems, a need for a heat exchanging device that is automatically replaceable also increases with a change in the shape and state of a processed article.

SUMMARY

According to an aspect of the disclosure, a heat exchanger module is provided of which a shape may be changed according to a change in a shape and state of an article to be processed, and an assembly-type heat exchanger including the heat exchanger module is provided.

According to an aspect of the disclosure, a heat exchanger module capable of adjusting a cooling capacity based on a change in a shape and state of an article to be processed is provided, and an assembly-type heat exchanger including the heat exchanger module is provided.

According to an aspect of the disclosure, a heat exchanger assembly system in which an assembly-type heat exchanger is automatically assembled according to a change in a shape and state of an article to be processed is provided.

Additional aspects will be set forth in part in the description which follows and, in part, will be apparent from the description, or may be learned by practice of the presented embodiments of the disclosure.

According to one or more embodiments, a heat exchanger module is provided. The heat exchanger module includes a first heat exchanging body including at least one first through hole; and a second heat exchanging body including at least one second through hole, the second heat exchanging body configured to be coupled to the first heat exchanging body, wherein an accommodation hole is provided between the first heat exchanging body and the second heat exchanging body by the first heat exchanging body and the second heat exchanging body being coupled together.

According to an embodiment, the heat exchanger module further includes: at least one first flow path body configured to provide at least one first flow path, the at least one first flow path body attachable to and detachable from the at least one first through hole; and at least one second flow path body configured to provide at least one second flow path, the at least one second flow path body attachable to and detachable from the at least one second through hole.

According to an embodiment, the heat exchanger module further includes at least one flow path body configured to provide at least one flow path, the at least one flow path body attachable to and detachable from the accommodation hole.

According to an embodiment, the heat exchanger module further includes at least one engagement body that is configured to couple the first heat exchanging body to the second heat exchanging body.

According to an embodiment, the heat exchanger module further includes heat exchanging fluid passing through the at least one flow path.

According to an embodiment, the heat exchanger module further includes heat exchanging fluid passing through any one from among the at least one first flow path and the at least one second flow path.

According to an embodiment, the heat exchanger module further includes a third heat exchanging body including at least one third through hole, the third heat exchanging body configured to be coupled to the first heat exchanging body and the second heat exchanging body, wherein the accommodation hole is provided between the first heat exchanging body, the second heat exchanging body, and the third heat exchanging body by the first heat exchanging body, the second heat exchanging body, and the third heat exchanging body being coupled together.

According to an embodiment, the heat exchanger module further includes at least one flow path body that is configured to provide at least one flow path, the at least one flow path body attachable to and detachable from the at least one third through hole.

According to an embodiment, the heat exchanger module further includes a fourth heat exchanging body including at least one fourth through hole, the fourth heat exchanging body configured to be coupled to two or more from among the first heat exchanging body, the second heat exchanging body, and the third heat exchanging body, wherein the accommodation hole is provided between the first heat exchanging body, the second heat exchanging body, the third heat exchanging body, and the fourth heat exchanging body by coupling among the first heat exchanging body, the second heat exchanging body, the third heat exchanging body, and the fourth heat exchanging body.

According to an embodiment, the heat exchanger module further includes at least one flow path body that is configured to provide at least one flow path, the at least one flow path body configured to be attachable to and detachable from the at least one fourth through hole.

According to one or more embodiments, an assembly-type heat exchanger is provided. The assembly-type heat exchanger includes: a plurality of heat exchanger modules; at least one first connector; and at least one second connector, wherein the at least one first connector is configured to connect the plurality of heat exchanger modules in a first direction, and the at least one second connector is configured to connect the plurality of heat exchanger modules in a second direction, different from the first direction, and wherein each of the plurality of heat exchanger modules includes: a first heat exchanging body including at least one first through hole; and a second heat exchanging body including at least one second through hole, the second heat exchanging body configured to be coupled to the first heat exchanging body, wherein an accommodation hole is provided between the first heat exchanging body and the second heat exchanging body by the first heat exchanging body and the second heat exchanging body being coupled together.

According to an embodiment, a first connector of the at least one first connector includes: at least one body configured to provide a connection flow path, the at least one body connected to the first through hole included in two of the plurality of heat exchanger modules; and at least one engagement body that fixes the two of the plurality of heat exchanger modules, relative to each other, in the first direction.

According to an embodiment, a second connector of the at least one second connector includes an engagement body that fixes two of the plurality of heat exchanger modules, relative to each other, in the second direction that is different from the first direction.

According to an embodiment, the plurality of heat exchanger modules includes: a first heat exchanger module; and a second heat exchanger module, wherein the first heat exchanger module and the second heat exchanger module are stacked such that the accommodation hole of the first heat exchanger module communicates with the accommodation hole of the second heat exchanger module.

According to an embodiment, the assembly-type heat exchanger further includes at least one engagement body that is configured to connect the first heat exchanger module to the second heat exchanger module in a direction in which the first heat exchanger module and the second heat exchanger module are stacked.

According to one or more embodiments, a heat exchanger assembly system for assembling a plurality of heat exchanger modules is provided, the heat exchanger assembly system includes: a plurality of identifiers arranged on each of the plurality of heat exchanger modules, respectively; a first communication module including at least one circuit, the first communication module configured to communication with a plurality of second communication modules; the plurality of second communication modules, the plurality of second communication modules including at least one circuit and arranged in each of the plurality of heat exchanger modules, respectively; and an assembly device including at least one actuated body configured to sequentially assemble the plurality of heat exchanger modules.

According to an embodiment, the heat exchanger assembly system further includes a transferring unit including at least one moveable body configured to transfer the plurality of heat exchanger modules.

According to an embodiment, the transferring unit further includes a third communication module including at least one circuit, the third communication module configured to communicate with the first communication module, and the transferring unit configured to transfer the plurality of heat exchanger modules to a determined position according to information received by the third communication module.

According to an embodiment, the at least one actuated body of the assembly device includes a robot arm.

According to an embodiment, the heat exchanger assembly system further includes the assembly device further includes a communication module including at least one circuit, the assembly device configured to communicate with the first communication module and assemble the plurality of heat exchanger modules at a determined position according to information received by the communication module of the assembly device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B is a second partial perspective view of the heat exchanger module according to the embodiment of the present disclosure;

DETAILED DESCRIPTION

Figure 1:
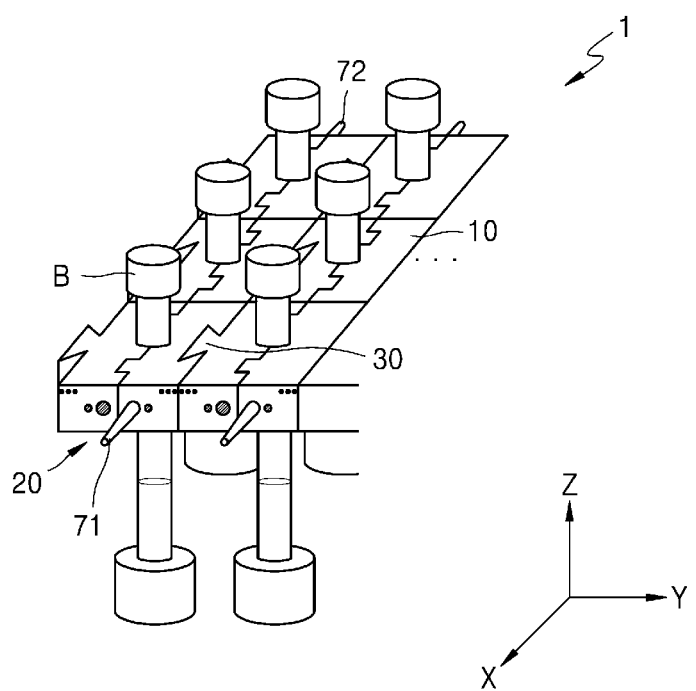
FIG. 1 is a perspective view of an assembly-type heat exchanger according to an embodiment of the present disclosure.

Reference will now be made in detail to embodiments of the present disclosure, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described with reference to the accompanying drawings. Throughout the drawings, like reference numerals refer to like elements, and each element may be exaggerated in size for clarity and convenience of a description. Meanwhile, the following embodiments are merely illustrative, and various modifications may be possible from the embodiments.

An expression such as "above" or "on" may include not only the meaning of "immediately on in a contact manner", but also the meaning of "on in a non-contact manner".

Terms such as first, second, and the like may be used to describe various elements, but the elements should not be limited to those terms. These terms may be used for the purpose of distinguishing one element from another element.

As used herein, the singular forms are intended to include the plural forms as well, unless the context clearly indicates otherwise. When it is assumed that a certain part includes a certain component, the term "including" means that a corresponding component may further include other components unless a specific meaning opposed to the corresponding component is written.

FIG. 1 is a perspective view of an assembly-type heat exchanger according to an embodiment of the present disclosure.

Referring to FIG. 1, an assembly-type heat exchanger 1 according to an embodiment of the present disclosure may include a plurality of a heat exchanging module 10, a first connection portion 20 (e.g. a connector) for connecting the plurality of the heat exchanger module 10 in a first direction X, a second connection portion 30 (e.g. a connector) for connecting the plurality of the heat exchanger module 10 in a second direction Y that is different from the first direction X, an injection portion 71 for injecting heat exchanging fluid to the plurality of the heat exchanger module 10, and a discharge portion 72. Herein, a processed article that may be heated or cooled by the assembly-type heat exchanger 1 may include not only a processed article accommodated in a processed article case B, but also the processed article that may be injected and discharged to and from the assembly-type heat exchanger 1 in the form of fluid. Moreover, the processed article case B or the processed article that may be arranged in the assembly-type heat exchanger 1 may have various shapes. The state of the processed article that may be arranged in the assembly-type heat exchanger 1 may be one or more of gas, liquid, and solid. Hereinafter, for convenience of a description, a form in which the processed article in the form of fluid is accommodated and closed in the processed article case B will be described first.

The plurality of the heat exchanger module 10 may be arranged to be connected with one another. The plurality of the heat exchanger module 10 according to an embodiment may be arranged adjacent to one another in a first direction, e.g., an X-axis direction. The plurality of the heat exchanger module 10 may also be arranged adjacent to one another in a second direction that is different from the first direction, e.g., a Y-axis direction. As the plurality of the heat exchanger module 10 are arranged in the first direction and the second direction as described above, the plurality of the heat exchanger module 10 may be arranged along a plane. In this case, the first connection portion 20 may connect the plurality of the heat exchanger module 10 arranged in the first direction to one another. The second connection portion 30 may connect the plurality of the heat exchanger module 10 arranged in the second direction to one another. The plurality of the heat exchanger module 10 according to an embodiment may be arranged as a three-dimensionally stacked structure, in which the plurality of the heat exchanger module 10 may be connected using a third connection portion 40 (e.g. a connector) (see FIG. 9). Details regarding the first connection portion 20, the second connection portion 30, and the third connection portion 40 for connecting the plurality of the heat exchanger module 10 to one another will be described with reference to FIGS. 6A through FIG. 8.

In the assembly-type heat exchanger 1 in which the plurality of the heat exchanger module 10 are coupled, a heat exchanging target, e.g., the processed article case B receiving the processed article may be arranged. The heat exchanging fluid may be injected through the injection portion 71, may be circulated inside the assembly-type heat exchanger 1, and then may be discharged through the discharge portion 72. The heat exchanging fluid according to an example may include water, alcohol, oil, etc., but the present disclosure is not limited thereto. The heat exchanging fluid according to an example may include an arbitrary fluid material flowing through a flow path and an additive. Hereinbelow, the plurality of the heat exchanger module 10 constituting the assembly-type heat exchanger 1 will be described in more detail.

Figure 2A:
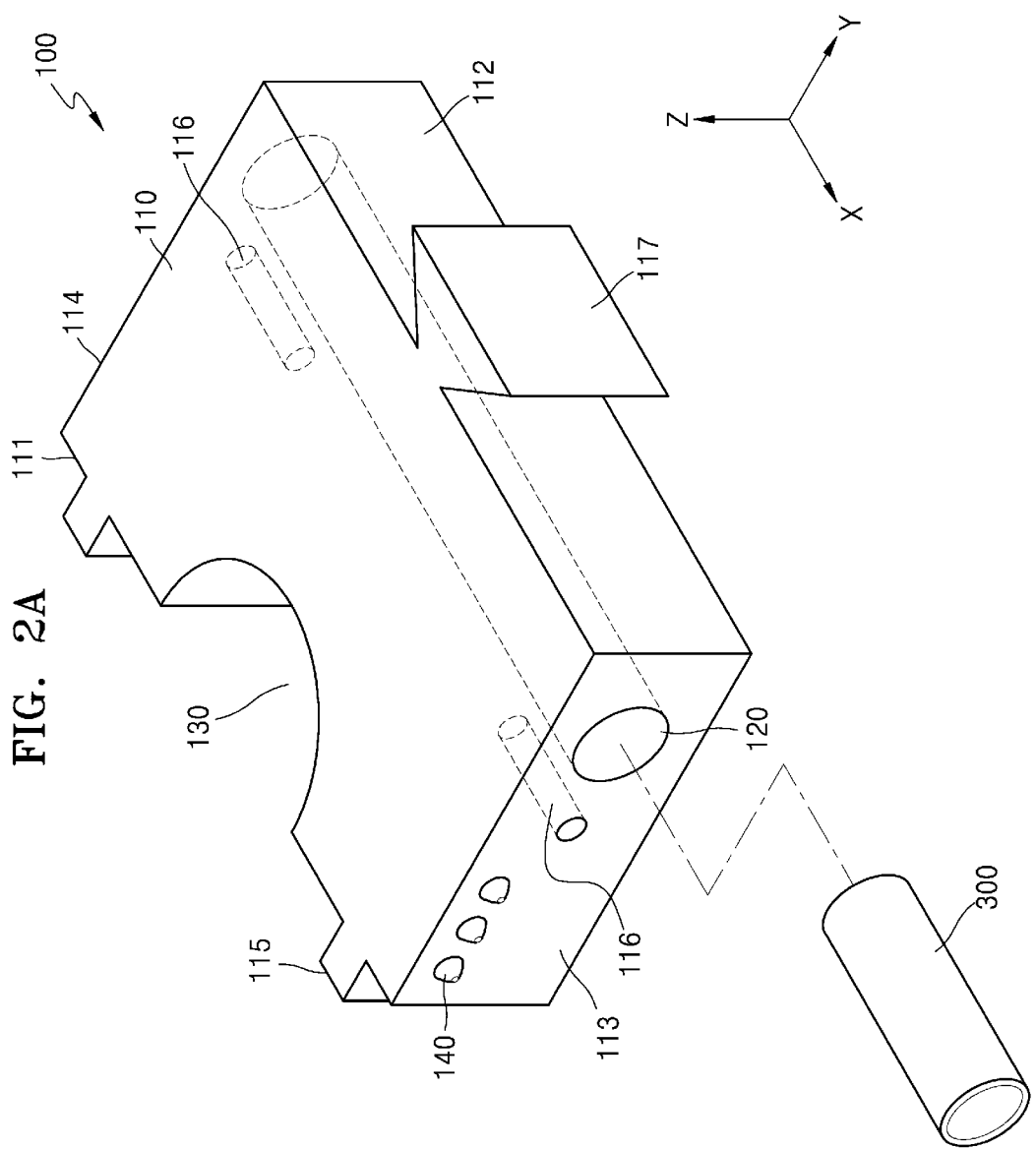
FIG. 2A is a first partial perspective view of a heat exchanger module according to an embodiment of the present disclosure.
Figure 3:
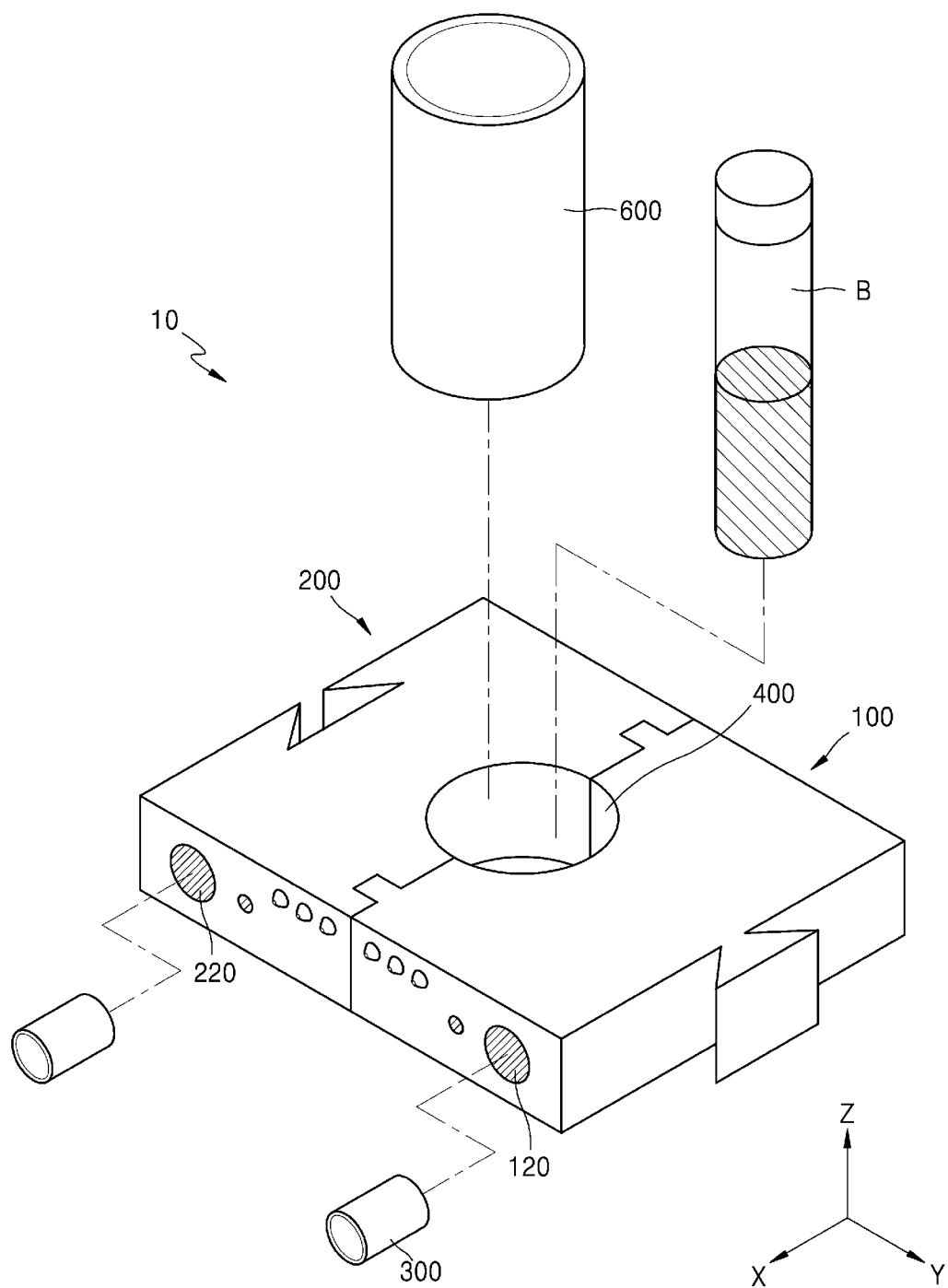
FIG. 3 is a perspective view of the heat exchanger module according to the embodiment of the present disclosure.

FIGS. 2A and 2B are partial perspective views of a heat exchanger module according to an embodiment of the present disclosure. FIG. 3 is a perspective view of a heat exchanger module according to an embodiment of the present disclosure.

Referring to FIGS. 2A through 3, the heat exchanger module 10 according to an example may include a first heat exchanging portion 100 (e.g. a first heat exchanging body), a second heat exchanging portion 200 (e.g. a second heat exchanging body), a first flow path 300, an accommodation portion 400 (e.g. an accommodation hole) formed by coupling the first heat exchanging portion 100 to the second heat exchanging portion 200, and a second flow path 500. According to embodiments, the first flow path 300 and the second flow path 500 may each be formed by a respective flow path body.

The first heat exchanging portion 100 may include a first base portion 110 in the shape of a housing, a first through portion 120 penetrating the first base portion 110, a first coupling recessed groove 130, and an identification portion 140. The first base portion 110 according to an embodiment may be a support portion capable of supporting a processed article that is a heat exchanging target with the first flow path 300 to be described later. For example, the first base portion 110 may be provided in the shape of a rectangular parallelepiped flat plate, and an engagement portion and a connection portion for connection with the second base portion 210 provided in the second heat exchanging portion 200 or with another heat exchanger module 10 may be arranged on four sides of the first base portion 110.

For example, a first engagement portion 115 (e.g. an engagement body) for coupling the first heat exchanging portion 100 with the second heat exchanging portion 200 may be arranged on a first side 111 of the first base portion 110. A third engagement portion 117 (e.g. an engagement body) for coupling with another heat exchanger module 10 that is adjacent in the second direction Y may be arranged on a second side 112 opposing the first side 111. The first engagement portion 115 and the third engagement portion 117 according to an embodiment may be provided in the shape of a protrusion portion (e.g. a protrusion). A second engagement portion 116 (e.g. an engagement body) for coupling with another heat exchanger module 10 that is adjacent in the first direction X may be arranged on a third side 113 and a fourth side 114. The second engagement portion 116 according to an embodiment may be provided as a magnet using a magnetic force.

The first engagement portion 115 through the third engagement portion 117 are provided as protrusion portions or magnets, but the present disclosure is not limited thereto, and an arbitrary engagement portion for coupling between two members may be arranged. The first engagement portion 115 through the third engagement portion 117 may be formed integrally into one shape with the first base portion 110 or may be formed as separate members separable from the first base portion 110.

The first base portion 110 may include a material having high thermal conductivity, e.g., metal having high thermal conductivity, such as aluminum, etc., because the first base portion 110 may need to be capable of delivering heat between heat exchanging fluid passing through the first flow path 300 and a heat exchanging target and easily delivering the delivered heat to external air. However, the present disclosure is not limited thereto, and depending on a need, the first base portion 110 may include various materials.

The first through portion 120 may be formed to pass through the first base portion 110 and may extend in a direction. For example, the first through portion 120 may extend in the first direction X and may be a support portion into which the first flow path 300 through which the heat exchanging fluid may pass may be inserted. However, the present disclosure is not limited thereto, and the first flow path 300 may not be inserted into the first through portion 120, and in this case, the heat exchanging fluid may flow along the first through portion 120.

For example, the first through portion 120 may be provided as one or more portions. When a plurality of the first through portion 120 is provided, the number of the first flow path 300 inserted into the plurality of the first through portion 120 may be adjusted based on a heat exchanging capacity required for a processed article. For example, when the required heat exchanging capacity is small, the first flow path 300 may be inserted into the first through portion 120 and the heat exchanging fluid may pass through the first flow path 300. On the other hand, when the required heat exchanging capacity is large, the first flow path 300 may be inserted into each of the plurality of the first through portion 120 and the heat exchanging fluid may pass through the plurality of the first flow path 300.

The first coupling recessed groove 130 may form the accommodation portion 400 by being coupled to a coupling recessed groove 230 provided in the second heat exchanging portion 200. The first coupling recessed groove 130 according to an example may be a processed article capable of exchanging heat with the heat exchanging fluid or a support portion in which the processed article case B may be arranged. For example, the first coupling recessed groove 130 may be provided to have a shape corresponding to a shape of the processed article or the processed article case B.

The identification portion 140 may be an identification member (e.g. an identifier) for identifying a form and a type of the first heat exchanging portion 100. For example, as described above, the number of the first through portion 120 included in the first heat exchanging portion 100 may be greater than or equal to one. The shape of the first coupling recessed groove 130 may change with a shape of the processed article or the processed article case B arranged therein. Thus, the form and the type of the first heat exchanging portion 100 may be determined according to the shape of the processed article arranged in the assembly-type heat exchanger 1 according to an embodiment or the shape of the processed article case B, and the number of the first through portion 120 may be determined based on the cooling capacity of the processed article. The identification portion 140 according to an example may include information of the first coupling recessed groove 130 and information about the number of the first through portion 120 according to the shape of the processed article or the processed article case B. For example, the identification portion 140 may include a character, a number, a figure, etc., but the present disclosure is not limited thereto.

The second heat exchanging portion 200 may include a second base portion 210 in the shape of a housing, a second through portion 220 penetrating the second base portion 210, a second coupling recessed groove 230, and an identification portion 240. The second base portion 210 according to an embodiment may be a support portion capable of supporting a processed article that is a heat exchanging target with the second flow path 500 to be described later. For example, the second base portion 210 may be provided in the shape of a rectangular parallelepiped flat plate, and an engagement portion and a connection portion for connection with the first base portion 110 provided in the first heat exchanging portion 100 or with another heat exchanger module 10 may be arranged on four sides of the second base portion 210.

For example, the first engagement portion 215, the second engagement portion 216, and the third engagement portion 217 may be arranged in the second base portion 210 to correspond to the first engagement portion 115 through the third engagement portion 117 provided in the first base portion 110. Functions and roles of the first engagement portion 215 through the third engagement portion 217 arranged in the second base portion 210 substantially correspond to the first engagement portion 115 through the third engagement portion 117 provided in the first base portion 110 and thus will not be described for convenience of a description.

The second base portion 210 according to an embodiment may include a material having high thermal conductivity, e.g., metal having high thermal conductivity, such as aluminum, etc., because the second base portion 210 may need to be capable of delivering heat between heat exchanging fluid passing through the second flow path 500 and a heat exchanging target and easily delivering the delivered heat to external air. However, the present disclosure is not limited thereto, and depending on a need, the second base portion 210 may include various materials.

The second through portion 220 may be formed to pass through the second base portion 210 and may extend in a direction. For example, the second through portion 220 may extend in the first direction X and may be a support portion into which the second flow path 500 through which the heat exchanging fluid may pass may be inserted. However, the present disclosure is not limited thereto, and the second flow path 500 may not be inserted into the second through portion 220, and in this case, the heat exchanging fluid may flow along the second through portion 220. For example, the second through portion 220 may be provided as one or more portions. A technical feature of adjusting a heat exchanging capacity with a plurality of the second through portion 220 is substantially the same as described with respect to the first through portion 120 and thus will not be further described.

The second coupling recessed groove 230 may form the accommodation portion 400 by being coupled to the first coupling recessed groove 130 provided in the first heat exchanging portion 100. The second coupling recessed groove 230 according to an embodiment may be a processed article capable of exchanging heat with the heat exchanging fluid or a support portion in which the processed article case B may be arranged. For example, the second coupling recessed groove 230 may be provided to have a shape corresponding to a shape of the processed article or the processed article case B.

The identification portion 240 may be an identification member (e.g. an identifier) for identifying a form and a type of the second heat exchanging portion 200. Details related to the identification portion 240 arranged in the second heat exchanging portion 200 are substantially the same as described with respect to the identification portion 140 arranged in the first heat exchanging portion 100 and thus will not be further described for convenience of description.

Referring to FIG. 3, the heat exchanger module 10 according to an example may be formed by coupling the first heat exchanging portion 100 to the second heat exchanging portion 200. For example, when the first heat exchanging portion 100 and the second heat exchanging portion 200 are coupled to each other, the accommodation portion 400 may be formed by coupling the first coupling recessed groove 130 to the second coupling recessed groove 230. According to an embodiment, the processed article case B including the processed article may be arranged in the accommodation portion 400, and a shape of a sidewall of the accommodation portion 400 may correspond to a shape of an outer wall of the processed article case B supported.

For example, the first flow path 300 and the second flow path 500 may be selectively arranged in the first through portion 120 and the second through portion 220. For example, when a heat exchanging capacity for a processed article accommodated in the processed article case B is large, heat exchanging fluid may pass through both the first flow path 300 and the second flow path 500. The number of the first through portion 120 and the second through portion 220 according to embodiments may be adjusted. Thus, the number of the first flow path 300 and the second flow path 500 arranged in the one or more of the first through portion 120 and the second through portion 220 may be further increased. By increasing the flow quantity of heat exchanging fluid passing through the increased number of the first flow path 300 and the second flow path 500, a heat exchanging capacity may be increased. When a heat exchanging capacity for a processed article accommodated in the processed article case B is small, heat exchanging fluid may pass through any one of the first flow path 300 and the second flow path 500.

In the foregoing embodiment, the first flow path 300 and the second flow path 500 have been described as a path through which the heat exchanging fluid passes, but when the first flow path 300 and the second flow path 500 are not arranged in the first through portion 120 and the second through portion 220, the heat exchanging fluid may also pass through the first through portion 120 and the second through portion 220. In this case, a heat exchanging capacity may be adjusted by controlling the number of the first through portion 120 and the second through portion 220.

According to an embodiment, the heat exchanging fluid may pass through the first flow path 300 and the second flow path 500 arranged in the first through portion 120 and the second through portion 220, and the processed article may be accommodated in the processed article case B arranged in the accommodation portion 400, such that heat exchange occurs. According to another embodiment, a third flow path 600 may be arranged in the accommodation portion 400. According to embodiments, the third flow path 600 may be formed by a flow path body. When the processed article that is a heat exchanging target is in the form of fluid, the heat exchanging target may flow in any one of the first flow path 300 through the third flow path 600. For example, when the processed article passes through one or more of the first flow path 300 and the second flow path 500, the heat exchanging fluid may exchange heat with the processed article by passing through the third flow path 600. As described above, a path in which and a heat exchanging capacity with which the processed article and the heat exchanging fluid exchange heat may be freely determined according to a type and an assembly scheme of the first heat exchanging portion 100 and the second heat exchanging portion 200, thus improving a degree of freedom in configuration of the heat exchanger module 10.

Figure 4:
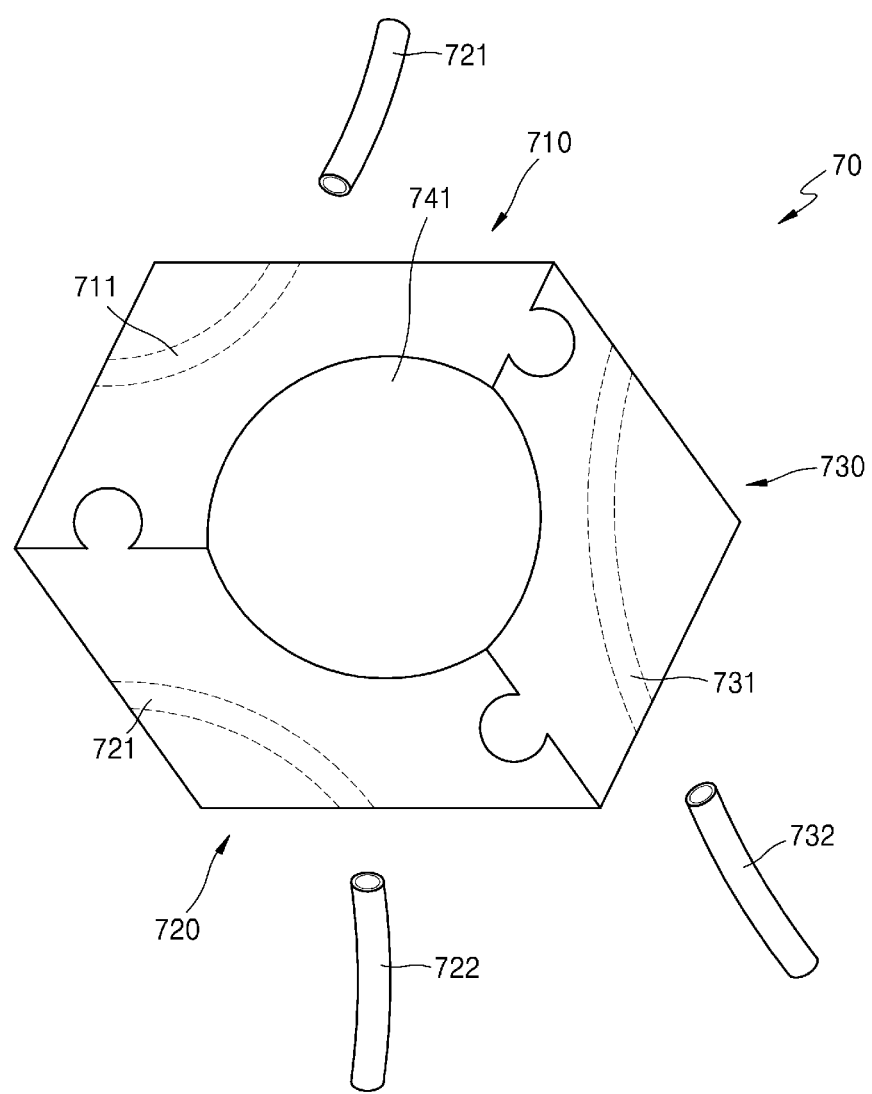
FIG. 4 is a perspective view of a heat exchanger module according to another embodiment of the present disclosure.
Figure 5:
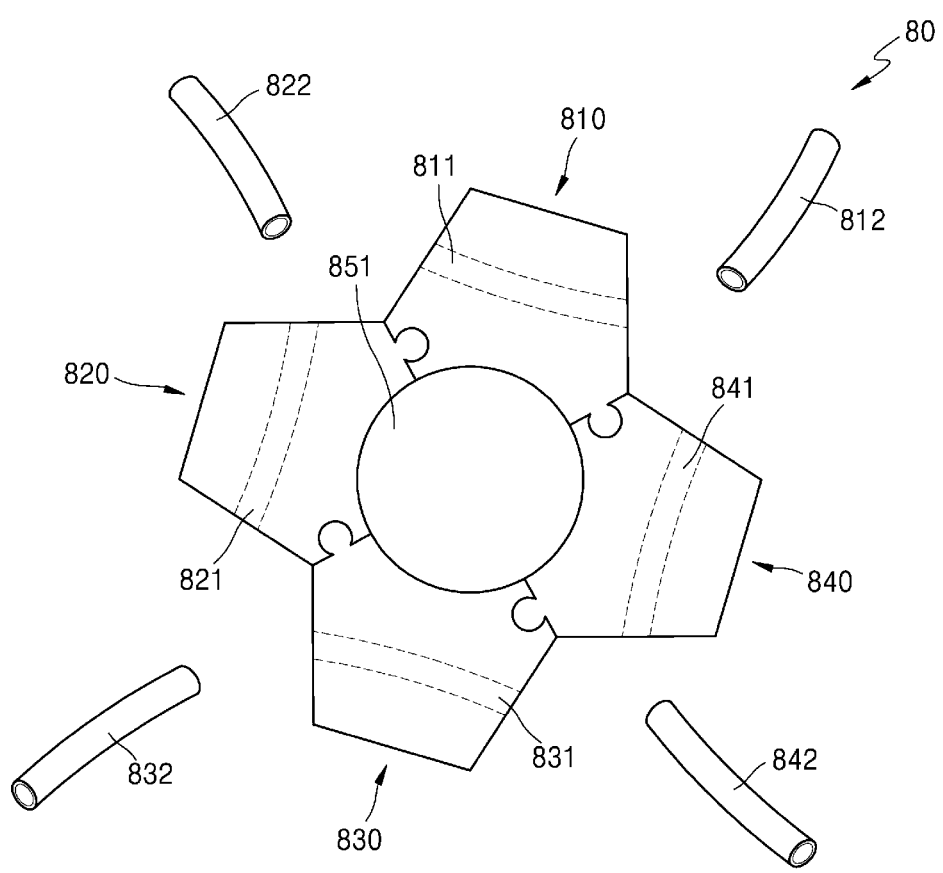
FIG. 5 is a perspective view of a heat exchanger module according to another embodiment of the present disclosure.

FIG. 4 is a perspective view of a heat exchanger module according to another embodiment of the present disclosure. FIG. 5 is a perspective view of a heat exchanger module according to another embodiment of the present disclosure.

As shown in FIG. 3, the heat exchanger module 10 according to an embodiment may be formed by coupling two heat exchanging portions to each other. However, the present disclosure is not limited thereto, and the number of heat exchanging portions may be changed variously, for example, two or more.

Referring to FIG. 4, a heat exchanger module 70 according to another embodiment may include three heat exchanging portions, e.g., a first heat exchanging portion 710 (e.g. a first heat exchanging body), a second heat exchanging portion 720 (e.g. a second heat exchanging body), and a third heat exchanging portion 730 (e.g. a third heat exchanging body) that are connected to one another. Each of the first heat exchanging portion 710 through the third heat exchanging portion 730 according to an embodiment may include one or more of a first through portion 711, one or more of a second through portion 721, and one or more of a third through portion 731. A first flow path 712, a second flow path 722, and a third flow path 732 may be arranged in the first through portion 711, the second through portion 721, and the third through portion 731. According to embodiments, the first flow path 712 through the third flow path 732 may each be formed by a respective flow path body. An accommodation portion 741 may be formed by coupling among the first heat exchanging portion 710, the second heat exchanging portion 720, and the third heat exchanging portion 730 according to an embodiment. In the accommodation portion 741, the processed article case B or the third flow path 600, as a fourth flow path, as shown in FIG. 3 may be arranged.

Referring to FIG. 5, a heat exchanger module 80 according to another embodiment may include four heat exchanging portions, e.g., a first heat exchanging portion 810 (e.g. a first heat exchanging body), a second heat exchanging portion 820 (e.g. a second heat exchanging body), a third heat exchanging portion 830 (e.g. a third heat exchanging body), and a fourth heat exchanging portion 840 (e.g. a fourth heat exchanging body) that are connected to one another. Each of the first heat exchanging portion 810 through the fourth heat exchanging portion 840 according to an embodiment may include one or more of a first through portion 811, one or more of a second through portion 821, one or more of a third through portion 831, and one or more of a fourth through portion 841. A first flow path 812, a second flow path 822, a third flow path 832, and a fourth flow path 842 may be arranged in the first through portion 811, the second through portion 821, the third through portion 831, and the fourth through portion 841. According to embodiments, the first flow path 812 through the fourth flow path 842 may each be formed by a respective flow path body. An accommodation portion 851 may be formed by coupling among the first heat exchanging portion 810, the second heat exchanging portion 820, the third heat exchanging portion 830, and the fourth heat exchanging portion 840 according to an embodiment. In the accommodation portion 851, the processed article case B or the third flow path 600, as a fifth flow path, as shown in FIG. 3 may be arranged.

As described above, as the number of heat exchanging portions forming the heat exchanger modules (e.g. heat exchanger module 10, heat exchanger module 70, and heat exchanger module 80) is changed, the shapes of the heat exchanger modules may be changed and the number of through holes and flow paths passing through the heat exchanging modules may be adjusted. Thus, a designer may select and assemble required heat exchanger modules according to the shape of a heat exchanging target and a heat exchanging capacity, thus improving the degree of freedom of configuration and reducing a manufacturing cost.

Figure 6:
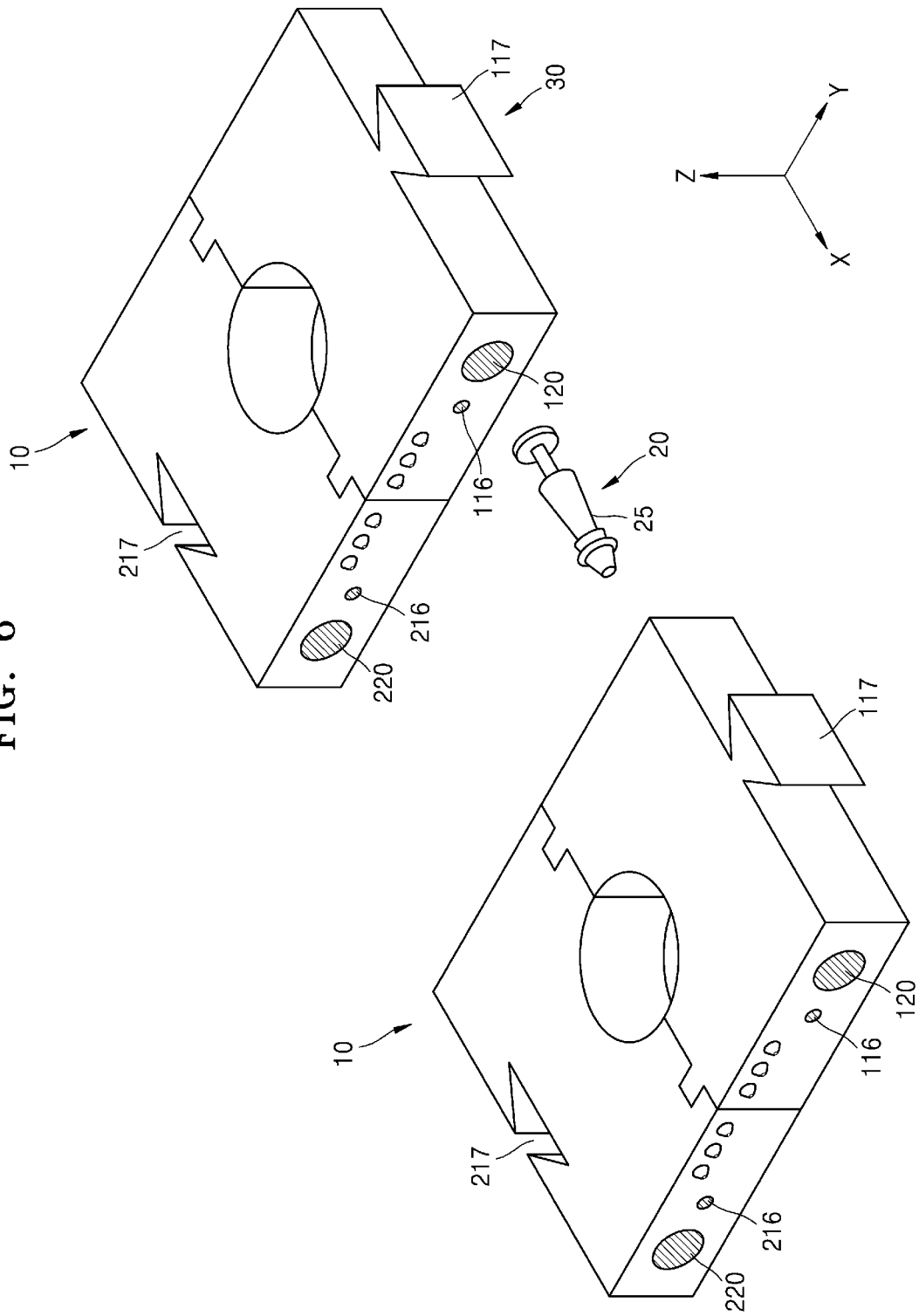
FIG. 6 is an exploded perspective view of an assembly-type heat exchanger according to an embodiment of the present disclosure.
Figure 7A:
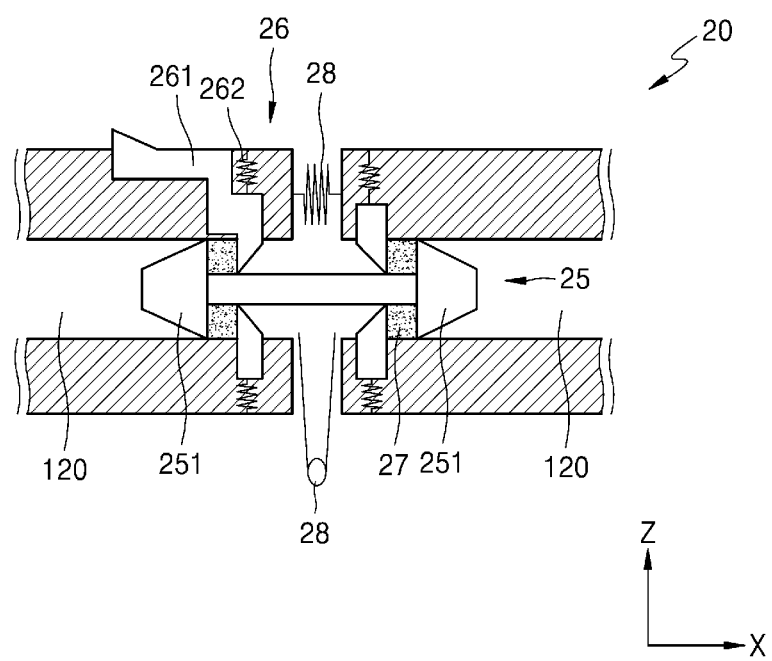
FIG. 7A is a partial cross-sectional view of an assembly-type heat exchanger including a connection portion according to an embodiment of the present disclosure.
Figure 7B:
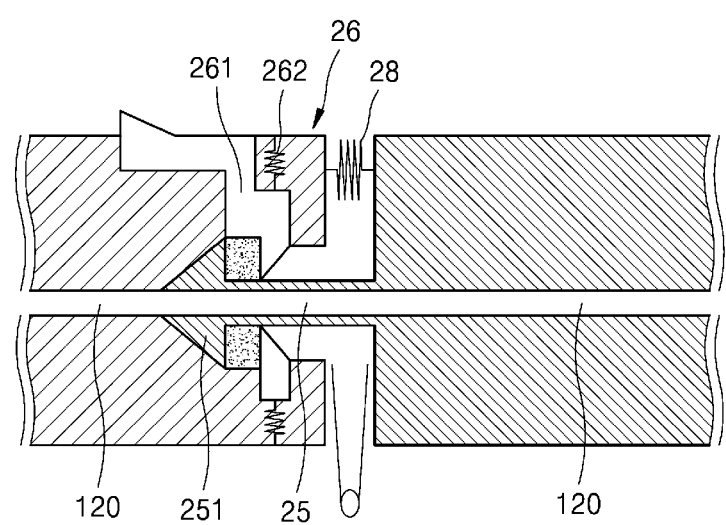
FIG. 7B is a partial cross-sectional view of an assembly-type heat exchanger including a connection portion according to an embodiment of the present disclosure.

FIG. 6 is an exploded perspective view of an assembly-type heat exchanger according to an example. FIGS. 7A and 7B are partial cross-sectional views of an assembly-type heat exchanger including a connection portion according to an example.

Referring to FIGS. 1 and 6, the plurality of the heat exchanger module 10 are connected by the first connection portion 20 in the first direction X, and are connected by the second connection portion 30 in the second direction Y that is different from the first direction X. The first connection portion 20 according to an embodiment may include a connection flow path 25 for connection with the first through portion 120 or the second through portion 220 included in the plurality of the heat exchanger module 10, and second engagement portion 116 and second engagement portion 216 for connecting the plurality of the heat exchanger module 10 in the first direction X. Details related to the connection flow path 25 for connection with the first through portion 120 or the second through portion 220 will be described later with reference to FIGS. 7A and 7B.

The second engagement portion 116 according to an embodiment may be arranged in the first heat exchanging portion 100 and couple an adjacent heat exchanger module 10 in the first direction X. The second engagement portion 216 provided in the second heat exchanging portion 200 may be arranged for coupling between the adjacent heat exchanger module 10 in the first direction X. For example, depending on an engagement strength, the second engagement portion 116 and the second engagement portion 216 may be arranged in one or more of the first heat exchanging portion 100 and the second heat exchanging portion 200. The second engagement portion 116 and the second engagement portion 216 according to an embodiment may be provided as a magnet using a magnetic force, but the present disclosure is not limited thereto.

The second connection portion 30 according to an embodiment may include one or more of a third engagement portion 117 and a third engagement portion 217 for connecting the plurality of the heat exchanger module 10 in the second direction Y. According to an example, the third engagement portion 117 may be arranged in the first heat exchanging portion 100, and the third engagement portion 217 may be arranged in the second heat exchanging portion 200. As the third engagement portion 117 arranged in a first heat exchanging portion 100 and the third engagement portion 217 arranged in a second heat exchanging portion 200 are coupled to each other, the first heat exchanging portion 100 and the second heat exchanging portion 200 may be connected in the second direction Y. Although not shown in FIGS. 1 and 6, when a through hole through which heat exchanging fluid flows is arranged in the second direction Y, a separate connection flow path may be arranged (e.g. within adjacent ones of the heat exchanger module 10 in the second direction Y).

Referring to FIG. 7A, the first connection portion 20 according to an embodiment may include the connection flow path 25, a locking portion 26, a sealing member 27, and an elastic member 28. The connection flow path 25 according to an embodiment may be arranged between a plurality of the first through portion 120 included in a plurality of the heat exchanger module 10 that are arranged adjacent in the first direction X, and may be in the form of a pipe to deliver heat exchanging fluid that flows along the first through portion 120. A locking member 251 engageable with the locking portion 26 may be arranged in opposite end portions of the connection flow path 25. The locking portion 26 according to an embodiment may be arranged in an end portion of the first through portion 120, and may include an engagement structure 261 engageable with the locking member 251 and a spring structure 262 for restoration of the engagement structure 261. The sealing member 27 according to an embodiment may be arranged between the locking member 251 and the engagement structure 261. For example, the sealing member 27 may include a material capable of preventing leakage of heat exchanging fluid, e.g., a rubber material having an elastic force. Thus, the sealing member 27 may prevent heat exchanging fluid moving via the first through portion 120 and the connection flow path 25 from leaking outside. The elastic member 28 may be arranged between the plurality of the first through portion 120 and maintain an interval between the plurality of the first through portion 120, thus improving a sealing force of the sealing member 27. While the connection flow path 25 and the heat exchanger module 10 are formed as separate components in the foregoing embodiment, the connection flow path 25 and the heat exchanger module 10 may also be formed integrally.

Referring to FIG. 7B, the connection flow path 25 according to an embodiment may be formed to extend from the end portion of the first through portion 120 arranged in a rear end, thus being formed integrally with the first through portion 120 arranged in the rear end. The locking member 251 may be arranged in a front end of the connection flow path 25 in such a way to be engaged with the engagement structure 261. Details related to the locking portion 26, the sealing member 27, and the elastic member 28 are substantially the same as shown in FIG. 7A, and thus will not be described further herein.

Figure 8:
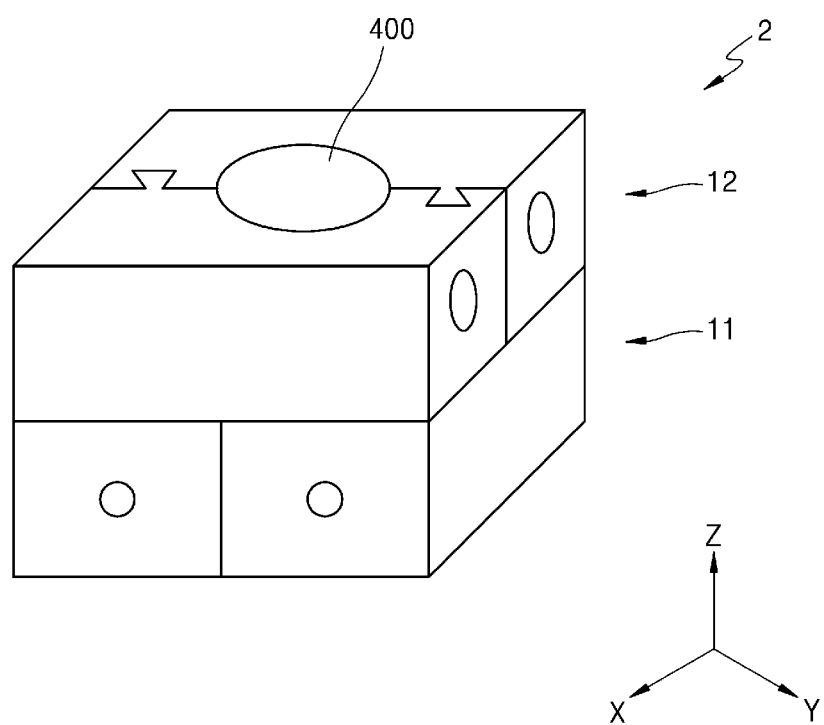
FIG. 8 is a perspective view of an assembly-type heat exchanger according to an embodiment of the present disclosure.
Figure 9:
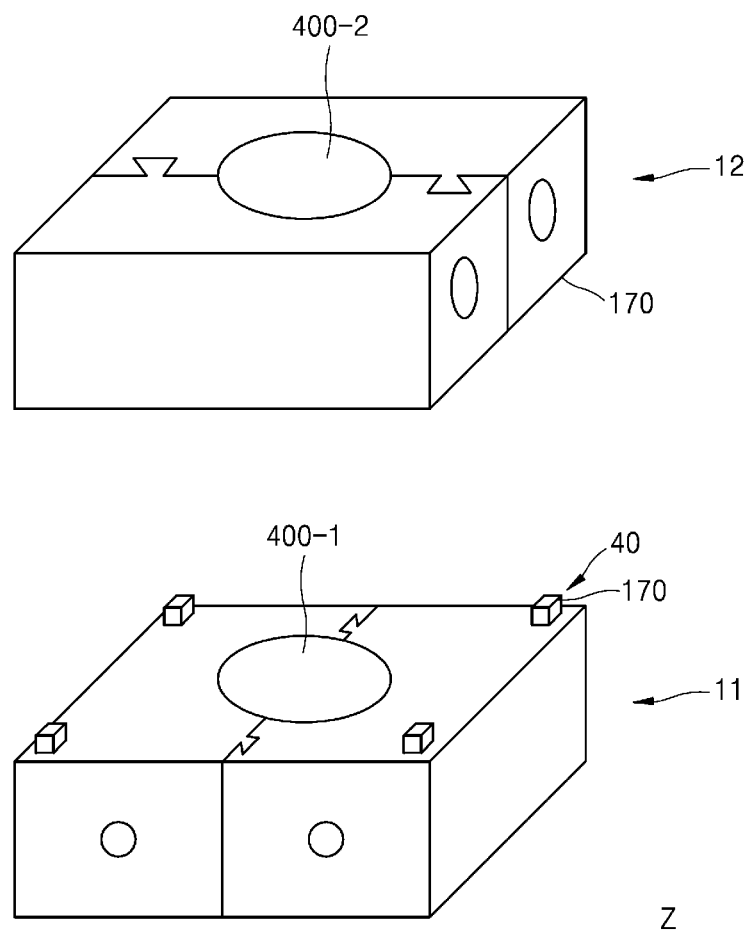
FIG. 9 is an exploded perspective view of an assembly-type heat exchanger according to an embodiment of the present disclosure.

FIG. 8 is a perspective view of an assembly-type heat exchanger according to an embodiment. FIG. 9 is an exploded perspective view of an assembly-type heat exchanger according to an embodiment.

In the foregoing embodiment, the plurality of the heat exchanger module 10 may be arranged to be connected to one another along a two-dimensional plane. The plurality of the heat exchanger module 10 according to an embodiment may be arranged in a 3D structure and may be connected to one another.

Referring to FIGS. 8 and 9, an assembly-type heat exchanger 2 according to an embodiment may include a first heat exchanger module 11 and a second heat exchanger module 12. Details related to a through hole included in the first heat exchanger module 11 and the second heat exchanger module 12, to allow heat exchanging fluid to pass therethrough and an engagement portion connecting a first heat exchanging portion with a second heat exchanging portion are substantially the same as components as shown in FIG. 3, and thus will not be further described herein.

According to an embodiment, the first heat exchanger module 11 and the second heat exchanger module 12 included in the assembly-type heat exchanger 2 may be arranged to be stacked in a third direction Z. A first accommodation portion 400-1 included in the first heat exchanger module 11 and a second accommodation portion 400-2 included in the second heat exchanger module 12 may be arranged to be connected to each other in the third direction Z. The processed article case B (see FIG. 3) that is a heat exchanging target or the third flow path 600 (see FIG. 3) may be supported via the first accommodation portion 400-1 and the second accommodation portion 400-2.

According to an embodiment, the first heat exchanger module 11 and the second heat exchanger module 12 may include a fourth engagement portion 170 included in the third connection portion 40. The fourth engagement portion 170 may be arranged in the first heat exchanger module 11 and the second heat exchanger module 12, and fix the first heat exchanger module 11 and the second heat exchanger module 12 in the third direction Z. For example, the fourth engagement portion 170 may include a recessed groove and a protrusion portion that correspond to each other. However, the present disclosure is not limited thereto, and an arbitrary engagement member for fixing the first heat exchanger module 11 and the second heat exchanger module 12 in the third direction Z may be used.

As described above, a plurality of heat exchanger modules (e.g. one or more heat exchanger module 10, one or more first heat exchanger module 11, and one or more second heat exchange module 12) may be arranged to be connected with one another in one of the first direction X, the second direction Y, or the third direction Z. Thus, a designer may select the plurality of heat exchanger modules having various shapes and heat exchanging capacities based on the shape and type of the processed article that is a heat exchanging target, and arrange and assemble them in a two-dimensional or three-dimensional form. Therefore, the degree of freedom of configuration for an assembly-type heat exchanger may be improved, and various heat exchanger modules may be selectively used depending on a need. Hereinbelow, a system for assembling the assembly-type heat exchanger 1 including the plurality of the heat exchanger module 10 by using an automatization system will be described.

Figure 10:
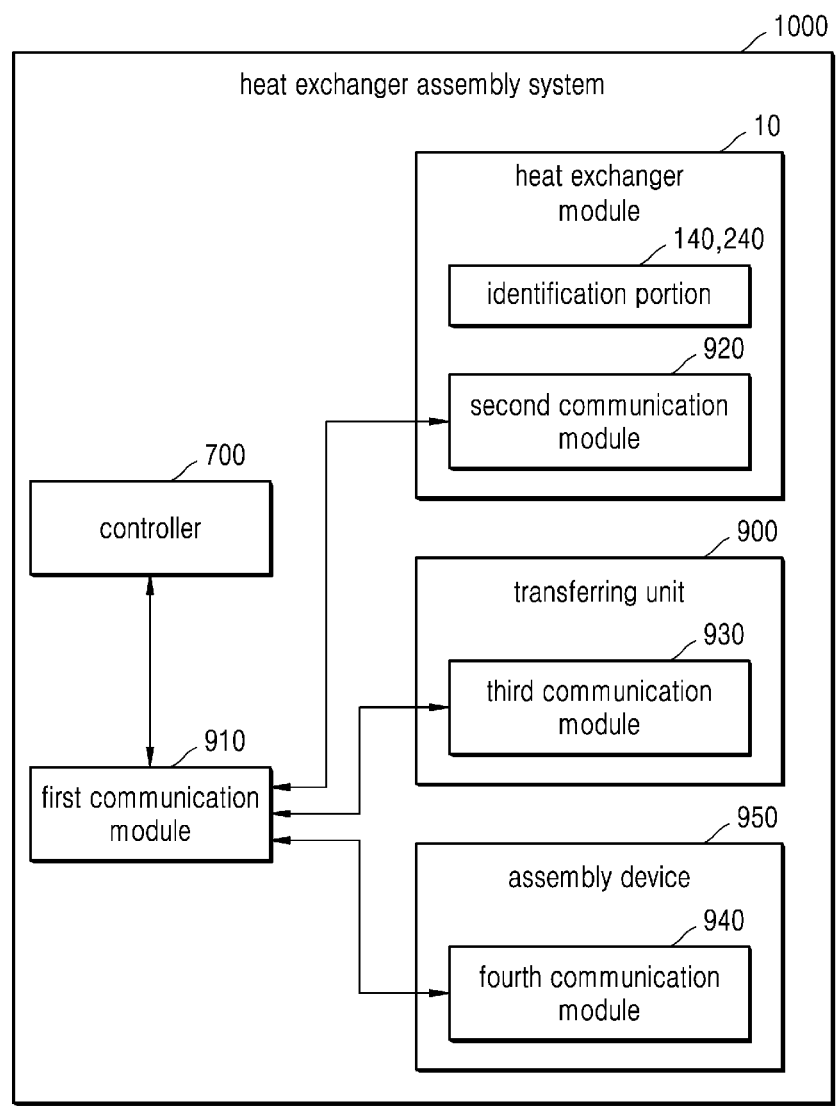
FIG. 10 is a block diagram of a heat exchanger assembly system according to an embodiment of the present disclosure.
Figure 11:
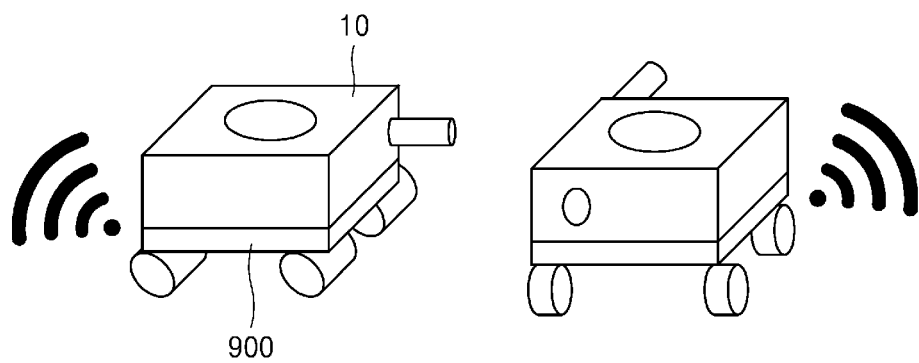
FIG. 11 is a schematic diagram of a transferring unit and a heat exchanger module according to an embodiment of the present disclosure.
Figure 12:
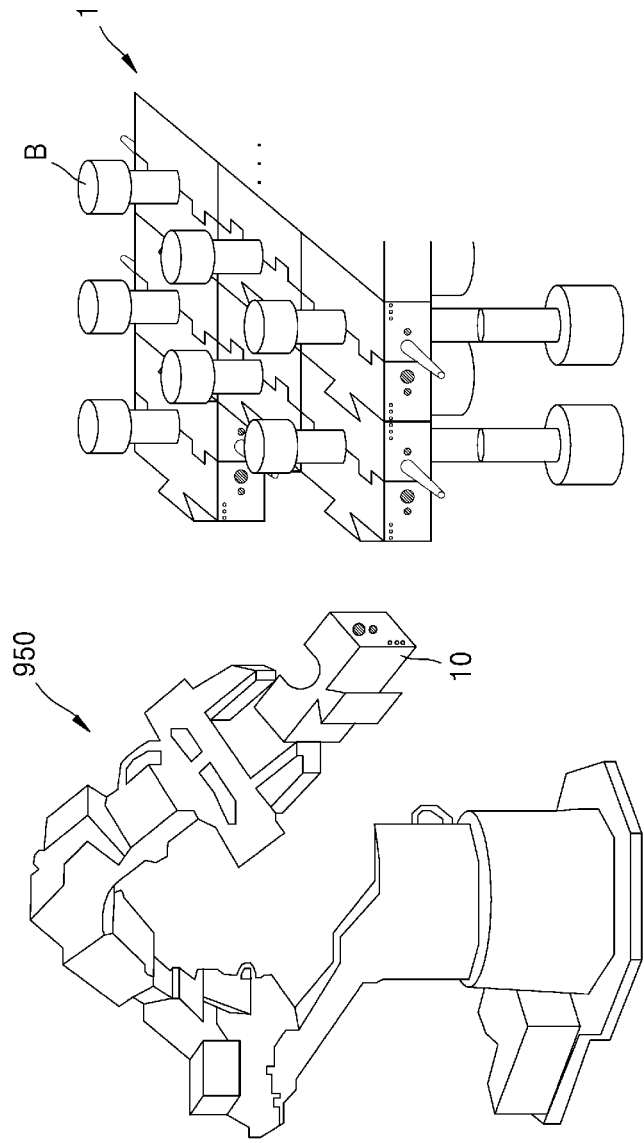
FIG. 12 is a schematic diagram of an assembly device and an assembly-type heat exchanger according to an embodiment of the present disclosure.
Figure 13:
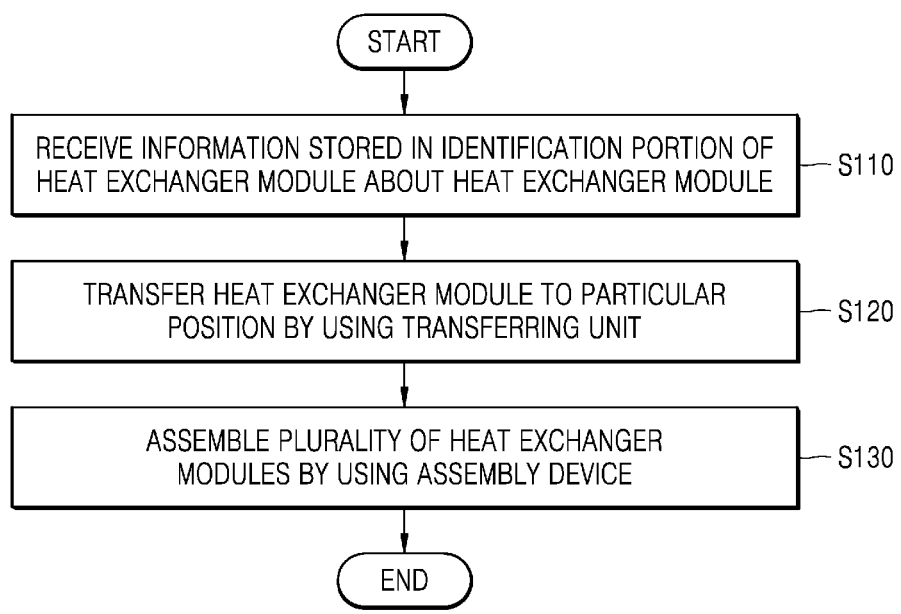
FIG. 13 is a flowchart of a method of assembling a heat exchanger according to an embodiment of the present disclosure.

FIG. 10 is a block diagram of a heat exchanger assembly system according to an example. FIG. 11 is a schematic diagram of a transferring unit and a heat exchanger module according to an example. FIG. 12 is a schematic diagram of an assembly device and an assembly-type heat exchanger according to an example. FIG. 13 is a flowchart of a method of assembling a heat exchanger according to an example.

Referring to FIGS. 2A, 2B, and 10, a heat exchanger assembly system 1000 according to an embodiment may include a plurality of the heat exchanger module 10, a controller 700, a first communication module 910, a transferring unit 900, and an assembly device 950. The controller 700 according to an embodiment may control driving of the heat exchanger assembly system 1000. For example, the controller 700 may receive information, stored in the identification portions 140 and 240, about a shape of the heat exchanger module 10, the number and position information of through portions, etc., and control operations of the transferring unit 900 and the assembly device 950.

The first communication module 910 may transmit and receive information by communicating with a second communication module 920, and a third communication module 930, and a fourth communication module 940 included in the heat exchanger module 10, the transferring unit 900, and the assembly device 950, respectively. For example, the first communication module 910 through the fourth communication module 940 may include arbitrary communication modules capable of transmitting and receiving information by using a wireless scheme. According to embodiments, the first communication module 910 through the fourth communication module 940 may each comprise at least one circuit configured to transmit and receive information by using a wireless scheme.

The transferring unit 900 may be a movable member (e.g. at least one moveable body) capable of moving the heat exchanger module 10 to a particular position. The transferring unit 900 may include the third communication module 930, and may move the heat exchanger module 10 to a particular position according to a control signal delivered from the first communication module 910 as shown in FIG. 10.

The assembly device 950 may connect and assemble the plurality of the heat exchanger module 10. The assembly device 950 according to an embodiment may include at least one actuated body (e.g. a robot arm) capable of holding the plurality of the heat exchanger module 10 to connect the plurality of the heat exchanger module 10 to each other as shown in FIG. 11. The assembly device 950 may include the fourth communication module 940, receive information about positions and types of the heat exchanger module 10 through communication with the first communication module 910, and then assemble the plurality of the heat exchanger module 10 at a particular position.

Referring to FIG. 13, the controller 700 may receive information stored in an identification portion of the heat exchanger module 10. In operation S110, for example, the controller 700 may receive information stored in the identification portion of the heat exchanger module 10 by using the first communication module 910 communicating with the second communication module 920 included in the heat exchanger module 10. For example, information such as the shape of the exchanger module 10, the number of through holes, and the position of the through holes may be stored in the identification portions 140 and 240 of the plurality of the heat exchanger module 10.

Next, the controller 700 may transfer the heat exchanger module 10 to a particular position by using the transferring unit 900. In operation S120, the controller 700 may determine the necessary heat exchanger module 10 by using the received information of the heat exchanger module 10 and then transfer the determined heat exchanger module 10 to the particular position. In this case, the controller 700 may transmit a control signal to the transferring unit 900 by using the first communication module 910 communicating with the third communication module 930 included in the transferring unit 900. The transferring unit 900 may transfer the heat exchanger module 10 to the particular position based on the received control signal.

Next, the plurality of the heat exchanger module 10 may be assembled by using the assembly device 950. In operation S130, the assembly device 950 according to an embodiment may assemble the plurality of the heat exchanger module 10 transferred to the particular position. In this case, the controller 700 may transfer a control signal regarding a position and a direction for assembly of the plurality of the heat exchanger module 10 to the fourth communication module 940 included in the assembly device 950. The assembly device 950 according to an embodiment may assemble the plurality of the heat exchanger module 10 in the particular position by using a holding device such as a robot arm, etc.

As described above, the heat exchanger module replaceable based on the type and shape of the processed particle for heat exchange and the heat exchanging capacity may be selected, and the automatically selected heat exchanger module may be automatically transferred and assembled to achieve system automation.

While the heat exchanger module, the assembly-type heat exchanger, and an operation method of the heat exchanger assembly system according to embodiments of the present disclosure have been shown to help understanding of the present disclosure, it will be apparent to those of ordinary skill in the art that modifications and variations may be made.

The heat exchanger module and the assembly-type heat exchanger according to an embodiment of the present disclosure may change shapes thereof based on a change in a shape and a state of a processed article.

Moreover, the heat exchanger module and the assembly-type heat exchanger according to an embodiment of the present disclosure may adjust a cooling capacity based on a change in a shape and a state of a processed article.

Furthermore, the heat exchanger assembly system according to an embodiment of the present disclosure may automatically assemble the assembly-type heat exchanger based on a change in a shape and a state of a processed article.

It should be understood that embodiments described herein should be considered in a descriptive sense only and not for purposes of limitation. Descriptions of features or aspects within each embodiment should typically be considered as available for other similar features or aspects in other embodiments of the present disclosure. While one or more embodiments have been described with reference to the figures, it will be understood by those of ordinary skill in the art that various changes in form and details may be made therein without departing from the spirit and scope as defined by the following claims.

What is claimed is:

1. A heat exchanger module comprising:
   a first heat exchanging body comprising at least one first through hole that extends in a first direction; and
   a second heat exchanging body comprising at least one second through hole that extends in a second direction, the second heat exchanging body configured to be coupled to the first heat exchanging body,
   wherein an accommodation hole is provided between the first heat exchanging body and the second heat exchanging body by the first heat exchanging body and the second heat exchanging body being coupled together,
   wherein the accommodation hole extends in a third direction that is perpendicular to the first direction and the second direction,
   wherein the heat exchanger module further comprises at least one first flow path body configured to provide at least one first flow path, the at least one first flow path body attachable to and detachable from the accommodation hole such that the at least one first flow path extends within the accommodation hole, in the third direction, between the first heat exchanging body and the second heat exchanging body,
   wherein the at least one first through hole extends, within the first heat exchanging body, to and past the accommodation hole in the first direction, and
   wherein the at least one second through hole extends, within the second heat exchanging body, to and past the accommodation hole in the second direction.

2. The heat exchanger module of claim 1, further comprising:
   at least one second flow path body configured to provide at least one second flow path, the at least one second flow path body attachable to and detachable from the at least one first through hole; and
   at least one third flow path body configured to provide at least one third flow path, the at least one third flow path body attachable to and detachable from the at least one second through hole.

3. The heat exchanger module of claim 1, further comprising at least one engagement body that is configured to couple the first heat exchanging body to the second heat exchanging body.

4. The heat exchanger module of claim 1, further comprising heat exchanging fluid passing through the at least one first flow path.

5. The heat exchanger module of claim 2, further comprising heat exchanging fluid passing through any one from among the at least one second flow path and the at least one third flow path.

6. An assembly-type heat exchanger comprising:
   a plurality of heat exchanger modules;
   at least one first connector; and
   at least one second connector,
   wherein the at least one first connector is configured to connect the plurality of heat exchanger modules in a first direction, and the at least one second connector is configured to connect the plurality of heat exchanger modules in a second direction, different from the first direction, and
   wherein each of the plurality of heat exchanger modules comprises:
      a first heat exchanging body comprising at least one first through hole that extends in a third direction; and
      a second heat exchanging body comprising at least one second through hole that extends in a fourth direction, the second heat exchanging body configured to be coupled to the first heat exchanging body,
   wherein an accommodation hole is provided between the first heat exchanging body and the second heat exchanging body by the first heat exchanging body and the second heat exchanging body being coupled together,
   wherein the accommodation hole extends in a fifth direction that is perpendicular to the third direction and the fourth direction, and
   wherein each of the plurality of heat exchanger modules further comprises at least one first flow path body configured to provide at least one first flow path, the at least one first flow path body attachable to and detachable from the accommodation hole such that the at least one first flow path extends within the accommodation hole, in the fifth direction, between the first heat exchanging body and the second heat exchanging body.

7. The assembly-type heat exchanger of claim 6, wherein a first connector of the at least one first connector comprises:
   at least one body configured to provide a connection flow path, the at least one body connected to the first through hole included in two of the plurality of heat exchanger modules; and
   at least one engagement body that fixes the two of the plurality of heat exchanger modules, relative to each other, in the first direction.

8. The assembly-type heat exchanger of claim 6, wherein a second connector of the at least one second connector comprises an engagement body that fixes two of the plurality of heat exchanger modules, relative to each other, in the second direction that is different from the first direction.

9. The assembly-type heat exchanger of claim 6, wherein the plurality of heat exchanger modules comprises:
   a first heat exchanger module; and
   a second heat exchanger module,
   wherein the first heat exchanger module and the second heat exchanger module are stacked in the fifth direction such that the accommodation hole of the first heat exchanger module communicates with the accommodation hole of the second heat exchanger module in the fifth direction.

10. The assembly-type heat exchanger of claim 9, further comprising at least one engagement body that is configured to connect the first heat exchanger module to the second heat exchanger module in the fifth direction in which the first heat exchanger module and the second heat exchanger module are stacked.

11. The heat exchanger module of claim 1, wherein
   the at least one first through hole and the at least one second through hole extend within a same virtual plane that extends in the first direction and the second direction and that is perpendicular to the third direction, and
   the accommodation hole extends to and past the same virtual plane in the third direction.

12. The heat exchanger module of claim 1, wherein the first heat exchanging body is a first single integral body and the second heat exchanging body is a second single integral body.

* * * * *